United States Patent
De Filippis et al.

(10) Patent No.: US 7,977,831 B2
(45) Date of Patent: Jul. 12, 2011

(54) ELECTROMOTOR

(75) Inventors: Pietro De Filippis, Milan (IT); Markus Egerland, Gerbrunn (DE); Detlef Kemmer, Altertheim (DE); Paul Stephen McLennan, London (CA); Harald Redelberger, Kürnach (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 102 days.

(21) Appl. No.: 11/572,932

(22) PCT Filed: Jun. 23, 2005

(86) PCT No.: PCT/EP2005/052941
§ 371 (c)(1),
(2), (4) Date: Jan. 30, 2007

(87) PCT Pub. No.: WO2006/013134
PCT Pub. Date: Feb. 9, 2006

(65) Prior Publication Data
US 2008/0030087 A1   Feb. 7, 2008

(30) Foreign Application Priority Data
Jul. 30, 2004   (EP) .................................. 04018133

(51) Int. Cl.
*H02K 9/06* (2006.01)
(52) U.S. Cl. ........................................... 310/58; 310/89
(58) Field of Classification Search ............... 417/423.8, 417/423.14; 310/58, 59, 89, 52, 67 R, 54
See application file for complete search history.

(56) References Cited

U.S. PATENT DOCUMENTS

| | | | | |
|---|---|---|---|---|
| 2,610,992 A * | 9/1952 | Johns et al. | ..................... | 310/57 |
| 3,643,119 A * | 2/1972 | Lukens | ........................ | 310/60 R |
| 5,019,737 A * | 5/1991 | Bruno | ............................. | 310/89 |
| 5,236,306 A * | 8/1993 | Hozak | ........................... | 416/93 R |
| 5,814,908 A * | 9/1998 | Muszynski | ..................... | 310/62 |
| 5,883,449 A * | 3/1999 | Mehta et al. | ............... | 310/60 R |
| 5,925,947 A * | 7/1999 | Kajiwara et al. | ............... | 310/64 |
| 6,059,541 A * | 5/2000 | Beckey et al. | .................. | 417/295 |
| 6,384,494 B1 * | 5/2002 | Avidano et al. | ................. | 310/58 |
| 6,700,235 B1 * | 3/2004 | McAfee | ......................... | 310/52 |
| 6,798,098 B1 * | 9/2004 | Tai | .............................. | 310/67 R |
| 6,924,570 B2 * | 8/2005 | De Filippis et al. | ........... | 310/71 |
| 7,042,121 B2 * | 5/2006 | De Filippis et al. | ........... | 310/63 |
| 2003/0107290 A1 * | 6/2003 | De Filippis | ................... | 310/216 |
| 2005/0088049 A1 * | 4/2005 | De Filippis et al. | ........... | 310/71 |
| 2005/0116554 A1 * | 6/2005 | Dano et al. | ..................... | 310/58 |
| 2006/0012254 A1 * | 1/2006 | Einheuser et al. | ............. | 310/58 |
| 2006/0022529 A1 * | 2/2006 | De Filippis et al. | ........... | 310/58 |

FOREIGN PATENT DOCUMENTS
DE   4143383 A1   2/1994
(Continued)

*Primary Examiner* — Quyen Leung
*Assistant Examiner* — Naishadh N Desai
(74) *Attorney, Agent, or Firm* — Westman, Champlin & Kelly, P.A.

(57) ABSTRACT

An electromotor has an external stator, and a ventilator vessel which is used to produce a cooling air flow for self-ventilation of the electromotor. In order to improve the cooling of an electromotors, it is proposed to use a ventilator vessel to help direct an air flow along the outer surface of the motor housing, through the inside of the housing of the electromotor and through an air gap formed between the motor housing wall and ventilator vessel.

15 Claims, 5 Drawing Sheets

FOREIGN PATENT DOCUMENTS

| | | | |
|---|---|---|---|
| DE | 9321100 U1 | 2/1996 | |
| EP | 0569738 A1 | 4/1993 | |
| EP | 569738 A1 * | 11/1993 | |
| EP | 0776081 A1 | 5/1997 | |
| EP | 050682 A2 | 11/2000 | |
| EP | 1050682 A2 * | 11/2000 | |
| GB | 2160924 A | 1/1986 | |
| JP | 60020750 A * | 2/1985 | |

* cited by examiner

ELECTROMOTOR

CROSS-REFERENCE TO RELATED APPLICATIONS

This application is a U.S. national stage application of International Application No. PCT/EP2005/052941 filed Jun. 23, 2005, which designates the United States of America, and claims priority to European application number 04018133.1 filed Jul. 30, 2004, the contents of which are hereby incorporated by reference in their entirety.

TECHNICAL FIELD

The invention relates to an electromotor with a fixed external stator, an internal rotor and devices for self-ventilation, for example for use as a radiator ventilator drive in a motor vehicle.

BACKGROUND

For the safe operation of electromotors, the materials used must not become overheated in the given operating conditions. One must make sure that no overheating occurs when the electromotor is run with maximum dissipation at the ambient temperature. To disregard this can result in the life of the electromotor being shortened or to a complete breakdown of the electromotor.

Therefore, cooling or dissipating the heat from the electromotor, i.e. removing the lost heat, especially from the winding, and from the electromagnetically active iron material, is extremely important.

In the case of electromotors used, for example, to drive ventilators, it is known to direct an air flow through the electromotor, using a difference in pressure between air inlet openings in the electromotor and air outlet openings in order to generate a cooling air flow.

Thus, for example, the European patent application EP 1 050 682 A2 shows a ventilator drive comprising a fixed internal stator with windings and an external rotor that is permanent magnetically excited. On the exterior of the stator base there are control electronics, which are covered by a separate cover. When in operation, a ventilator hub attached to the external rotor in a fixable manner generates a cooling air flow through internal ventilation blades arranged on the inside of the ventilator hub. The cooling air flow enters into the inside of the motor from the side, between the stator base part and the edge of the rotor and exits out into the environment through openings in the edge area of the rotor floor and the space between the outer wall of the stator and the ventilator hub. Thereby, the cooling air flow can only take up heat energy from the stator windings in the inside of the motor housing and dissipate it to the outside. Thus the cooling air flow can only produce an effect to a very limited extent.

SUMMARY

The task of the invention is to improve the cooling of an electromotor and thus to increase its thermal robustness. According to an embodiment, an electromotor may comprise a rotor rotatably mounted on a rotor axle and a fixed stator in the inside of a motor housing and a ventilator vessel, wherein the ventilator vessel is fixably or in torque proof fashion connected with the rotor and at least partially encompasses the motor housing in the shape of a pot, in such a way that an air gap with an air gap opening is formed between the outer wall of the motor housing and the wall of the ventilator vessel, wherein the motor housing has ventilation openings both outside and inside the air gap and the ventilator vessel has moldings, which act as air blades and are arranged in such a way that when the rotor is turning, a difference in pressure is formed between the ventilation opening arranged outside the air gap and the air gap opening, which generates an air flow, wherein the stator is an electromagnetically excited external stator, which has electromagnetically active iron material and a winding and which is fixably or in torque proof fashion connected to and in heat conducting connection with the outside wall of the motor housing and wherein in the inside of the motor housing the air flow flows directly past the stator and in the air gap past the exterior of the outside wall of the motor housing and takes up lost heat from the external stator in each case.

BRIEF DESCRIPTION OF THE DRAWINGS

This invention is described below with reference to an exemplary embodiment, which is explained in more detail with the aid of schematic drawings, in which.

DETAILED DESCRIPTION

Figure 1:
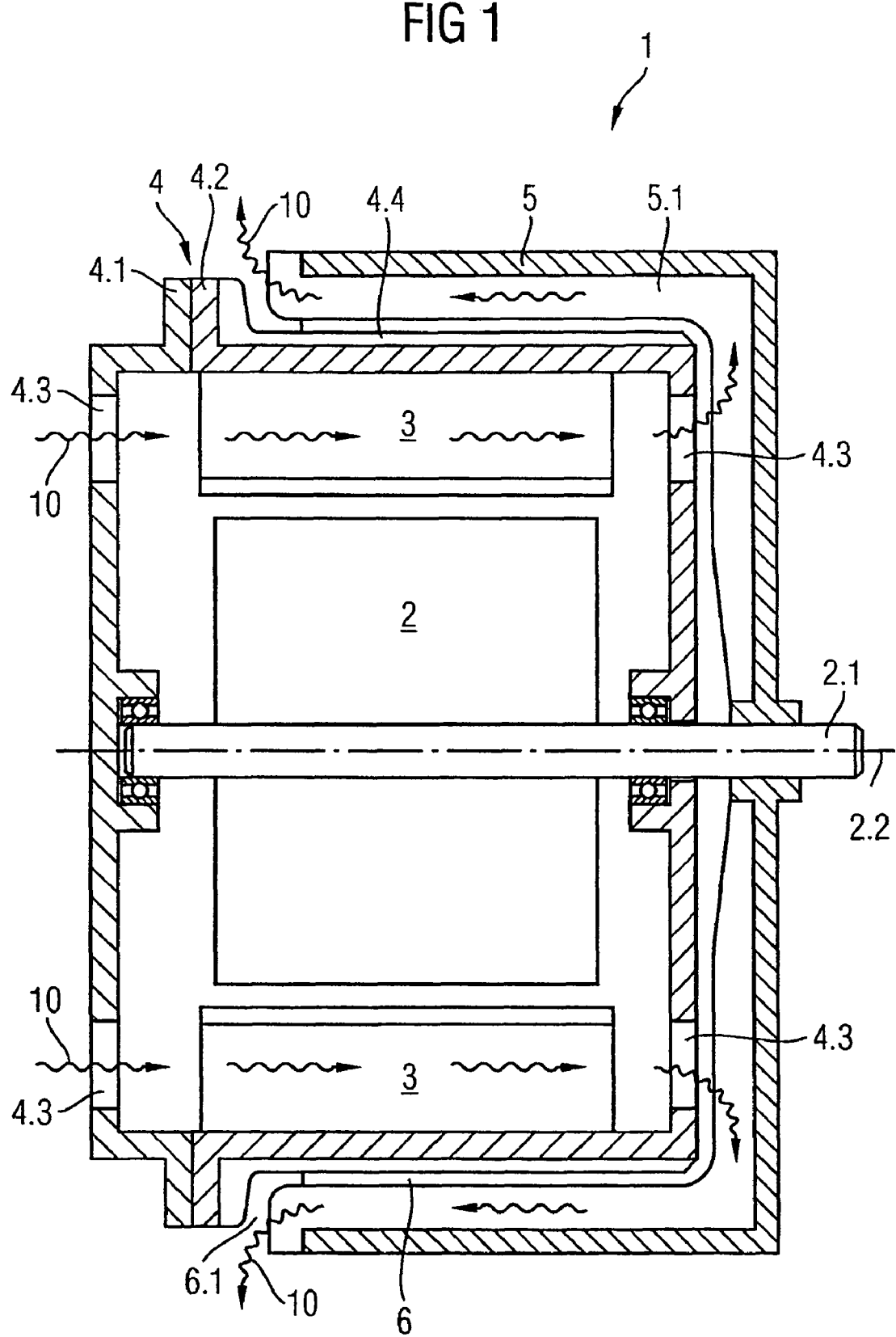
FIG. 1 shows a simplified schematic representation of an electromotor according to an embodiment.

The invention is based on the principle of improving the cooling of an electromotor by also using the motor housing encasing the electromotor as a heat sink to dissipate the lost heat from the winding to a cooling air flow. To do this, the cooling air flow is directed through the motor housing and in an air gap between a ventilator vessel and along the exterior of the motor housing.

According to an embodiment, the electromotor has a rotating internal rotor and a fixed, electromagnetically excited external stator with a winding. As opposed to an electromotor with a permanently excited external stator, here the lost heat from the winding and the electromagnetically charged iron material is dissipated outwards directly to the motor housing, which is connected with the external stator in a heat-conductive manner.

According to an embodiment, the cooling air flow is formed during operation by the ventilator vessel driven by the electromotor with the help of moldings, which extend in the air gap and/or after the air gap and act as air blades. According to an embodiment, the moldings of the ventilator vessel are arranged in such a way that, when the rotor is turning, a difference in pressure is formed between the ventilation opening arranged outside the air gap and the air gap opening, which difference creates an air flow to cool the external stator, which air flow flows directly past the stator in the inside of the motor housing and also in the air gap past the exterior of the motor housing external wall.

To this end, according to an embodiment, the motor housing has ventilation openings, through which the cooling air flow can flow into the motor housing and also out of it again.

The number, form and arrangement of the ventilation openings can vary depending on requirements and the housing geometry to the extent, for example, of total opening of a front side of the motor housing.

The direction of flow of the cooling air flow and hence the sequence in which the cooling air flow passes over the inside of the housing and the exterior wall of the housing depends on the design and arrangement of the moldings of the ventilator vessel which act as air blades and on the direction of rotation.

Thereby, the cooling of the external stator, thus of the winding and the electromagnetically active iron material of the electromotor, comprises, according to an embodiment, both the case that the cooling air flow takes up a part of the lost heat generated when it flows through the inside of the motor housing, and the case that, at the exterior of the motor housing, the cooling air flow takes up another part of the lost heat generated and dissipates it into the environment.

The dissipation of lost heat from the thermally loaded winding is thus significantly improved compared with a conventional electromotor. The improved cooling of the electromotors makes it possible to keep the same performance and have a smaller installation space requirement or to keep the same installation space requirement and have a higher performance. At the same time the electromotor is guaranteed a long service life. Breakdowns of the electromotor due to overheating are avoided.

According to an embodiment, the moldings, which increase the heat transferring surfaces of the motor housing, can be arranged inside the air gap between the ventilator vessel wall and the motor housing and/or in the areas bordering the air gap on the exterior of the motor housing. The cooling air flow passes over these moldings, in particular cooling fins or cooling pegs, and they serve as cooling elements. At the same time these cooling elements also help to create a swirl in the cooling air flow, as the ventilator vessel rotates relative to the fixed housing part on the output side. This arrangement allows even more waste heat to be picked up and dissipated as the cooling air flow passes through the circumferential air gap and/or as the air flow enters or exits into or out of the air gap opening. This further increases the thermal robustness of the electromotor.

Further advantages can be achieved by the fact that individual stator teeth of the external stator are wound in a single tooth winding pattern, according to an embodiment. Thereby the stator teeth arranged radially inwards on the external stator are each covered by a coil, whereby the wire windings of the coils are arranged in the slots disposed between the stator teeth. As the slots, for manufacturing reasons, cannot be completely filled with wire windings anyway, slot slits remain open between the individual stator teeth, according to an embodiment. The advantage of this type of winding is that no winding overhang is formed on the face covering the slots and thus the slot slits are open on both faces of the stator. This allows the cooling air flow an almost unhindered passage through the slot slits, in direct contact and in axial direction along the wire windings of the winding. Thereby the cooling air flow takes up the lost heat generated in the current-carrying wire windings. This measure increases the surface within the motor housing over which flows the cooling air flow. Moreover, the almost unhindered flow of the cooling air flow through the slot slits allows an increase in the air mass flow. Both features increase the dissipation of lost heat to the cooling air flow and thus also increase the thermal robustness.

According to a further embodiment, the electromotor may have a permanent magnet excited internal rotor. Such a rotor has itself the characteristic of generating almost no lost heat. This has the advantage that the cooling air flow in the inside of the motor housing is not burdened with additional heat and can be used to the full to take up lost heat from the wound external stator. Furthermore, according to an embodiment, such a rotor can itself be designed to be to a great extent airtight. This forces almost the entire cooling air flow to flow past the winding of the external stator and possibly through the slot slits between the stator teeth. As a result of this the air mass flow through the stator generating lost heat increases and hence the release of lost heat to the cooling air flow is increased and the cooling of the electromotor is improved.

According to an embodiment, through the arrangement of at least the ventilation openings of the first rear motor housing face with essentially the same radial spacing to the rotor axle as the winding, the slots or the slot slits of the stator, it is possible to achieve further advantages for the cooling of the electromotor and in particular the heat generating stator. With this arrangement of the ventilation openings, the cooling air flow entering the inside of the motor housing directly hits the winding and/or the slot slits arranged between the stator teeth. This enables the air flowing in from the environment to stream unhindered and targeted over the heat generating stator components and this ensures an efficient dissipation of heat to the cooling air flow and contributes to increasing the air mass flow and thus to an improved cooling.

According to a further embodiment, the motor housing or at least the part of the motor housing that is in heat conducting connection with the external stator, can be realized as a light metal die cast part. In particular, according to an embodiment, aluminum or magnesium alloys can be used for this. The use of die cast parts thereby allows relatively complicated housing geometry to be produced in a small number of process operations, as is not possible when using conventional press bent parts or deep drawn steel housings. In addition, these materials have very good heat conducting values, through which the removal of the lost heat via the motor housing outwards is further improved.

According to a further embodiment, the moldings of the ventilator vessel, which act as air blades, can be arranged in radial and/or axial direction, straight or curved on the inside of the ventilator vessel and be fitted to the contour of the motor housing with minimum spacing. Hereby the effect that generates the air pressure difference is increased. Thus, the air in the air gap is captured as completely as possible by the air blades and accelerated in a peripheral direction. At the same time, the centrifugal force accelerates the air in radial direction away from the motor axle. Because the air blades are arranged curved in radial direction on the ventilator vessel floor like the air blades of a radial blower, additional air pressure differences are formed on the ventilator blades, which accelerate the air flow further. By this means the air pressure difference as a whole is increased and hence the air mass flow, which in turn results in improved cooling of the electromotor.

If the electromotor according to an embodiment is used as a drive for a cooling blower, the ventilator vessel can serve at the same time as the hub of an impeller. Thereby the impeller has blower blades in order to create a blower air flow, which blower blades are arranged on the exterior of the ventilator vessel which serves as an impeller hub. The blower air flow generated by the turning of the impeller then flows over the exterior of the ventilator vessel. The increased flow velocity of the blower air flow in the region of the air gap opening causes the occurrence of a Venturi effect, which creates a vacuum in the region of the air gap opening. When the flow direction of the cooling air flow is so chosen that, after it has flowed through the inside of the housing, it exits into the environment through the air gap opening, the Venturi effect acts to intensify the cooling air flow. This in turn results in an increased air mass flow and hence a better cooling of the electromotor.

In FIG. 1 an electromotor 1 according to an embodiment is depicted in a very simplified schematic representation.

The electromotor 1 essentially comprises an internal rotor 2, an external stator 3, a motor housing 4 and a ventilator vessel 5. The internal rotor 2 is attached to a rotor shaft 2.1 in a fixable manner or in torque proof fashion and through this rotatably mounted on a rotor axle 2.2 in the motor housing 4. The ventilator vessel 5 is also fixably or in torque proof fashion attached to the rotor shaft 2.1 and in operation rotates with the internal rotor 2. The motor housing 4 is made up of a housing vessel 4.2 and a housing cover 4.1 and has ventilation openings 4.3. The ventilation openings 4.3 are arranged at the same radial distance from the rotor axle 2.1 as the wound stator teeth of the external stator 3. The ventilator vessel 5 encompasses the motor housing 4 in the shape of a pot and is arranged at both axial and radial distance from the exterior of the motor housing. As a result of this an air gap 6 is formed between the motor housing and ventilator vessel, with a circumferential annular gap shaped air gap opening 6.1 on the edge of the ventilator vessel.

On the internal surface of the ventilator vessel 5, there are arranged air blades 5.1, which extend in the air gap 6 up to the air gap opening 6.1. On the exterior of the housing vessel 4.2 cooling fins 4.4 are formed, which also extend in the air gap right into the air gap opening. By rotating the ventilator vessel 5 and with the help of the air blades 5.1, an air pressure difference is created between the ventilation openings 4.3 in the housing cover 4.1 and the air gap opening 6.1. This air pressure difference forms a cooling air flow 10, which flows through the ventilation openings 4.3 of the housing cover 4.1 into the inside of the housing, past the windings through the external stator 3, through the ventilation openings 4.3 in the housing vessel 4.2 into the air gap 6 and finally through the air gap opening 6.1 into the environment. In the course of the path described, the cooling air flow 10 takes up parts of the heat generated by the external stator both when flowing through the external stator 3 directly on the windings and also on the exterior of the motor housing at the cooling fins 4.4 in the air gap 6 and removes said parts into the environment.

Figure 2:
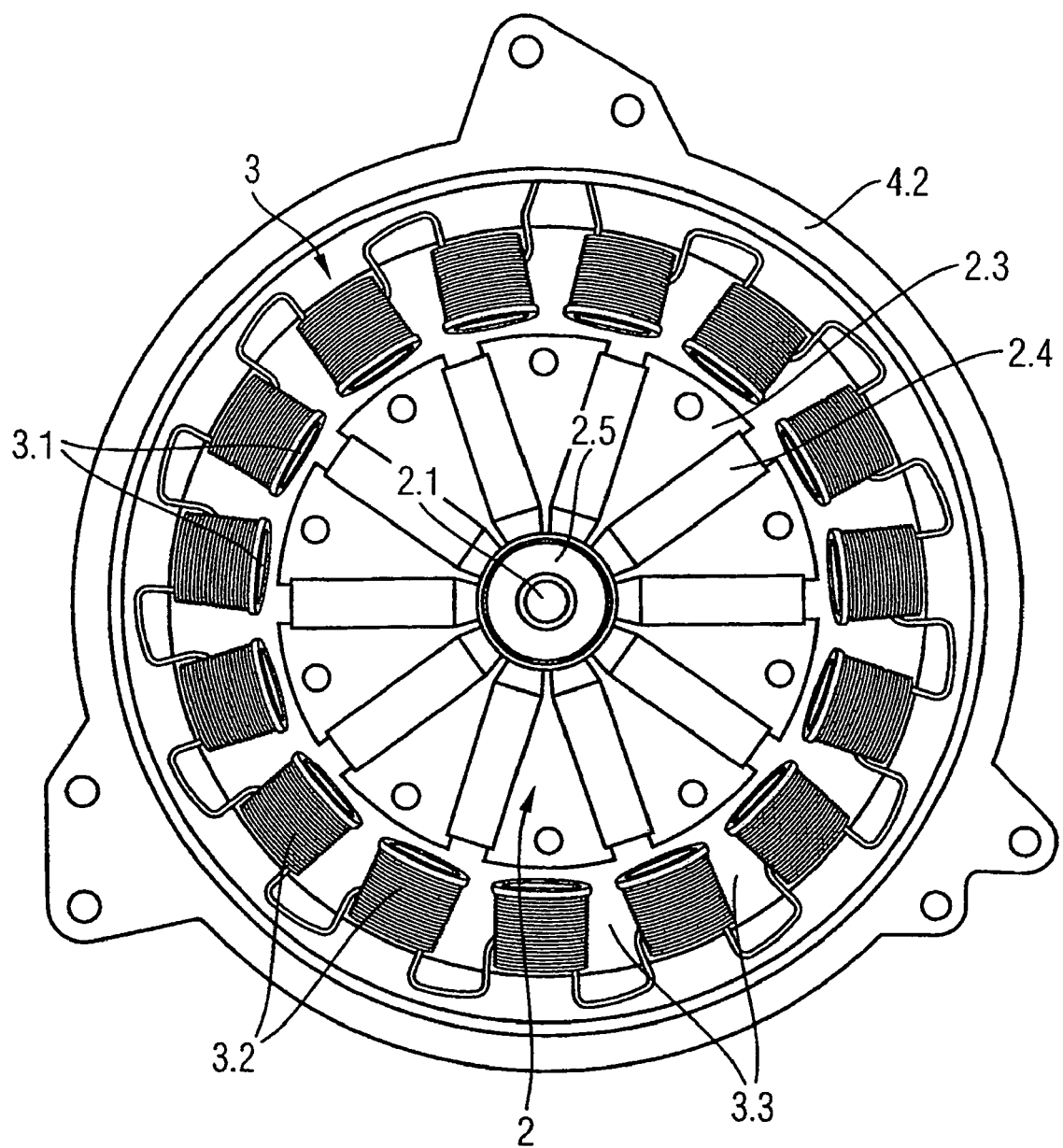
FIG. 2 shows a view from above of an embodiment of the electromotor 1 from the side facing away from a ventilator vessel (not visible in FIG. 2), with the housing cover removed.

FIG. 2 shows the view from above of an embodiment of the electromotor 1 from the side facing away from the ventilator vessel (not visible in FIG. 2). The housing cover is removed so that the inside of the motor is visible. The external stator 3 is arranged in the housing vessel 4.2. Thereby creating a heat conducting contact and a fixed connection between the housing vessel 4.2 and the external stator 3. This can be done by, for example, force fitting the external stator 3 into the housing vessel 4.2 or by inserting a hardening, heat conducting mass into the gap between external stator 3 and housing vessel 4.2. The external stator 3 is made of iron and has stator teeth 3.1, which are wound with single tooth windings 3.2 made of copper wire. Between the stator teeth 3.1 and their single tooth windings 3.2, are formed slot slits 3.3, which are open at both ends and enable an almost unhindered passage of air. The internal rotor 2 is arranged concentrically within the external stator 3 on a rotor shaft 2.1. The rotor shaft 2.1 is mounted in the housing with shaft bearings 2.5. The internal rotor 2 is a permanent magnet excited rotor and has a rotor core 2.3 made of iron with permanent magnets 2.4 arranged in it. The internal rotor is to a great extent a closed, massive component that does not allow any significant through passage of air. Because of this, in the inside of the housing almost the entire cooling air flow 10 is forcibly guided through the slot slits 3.3 past the heat generating coils of single tooth windings 3.2.

Figure 3:
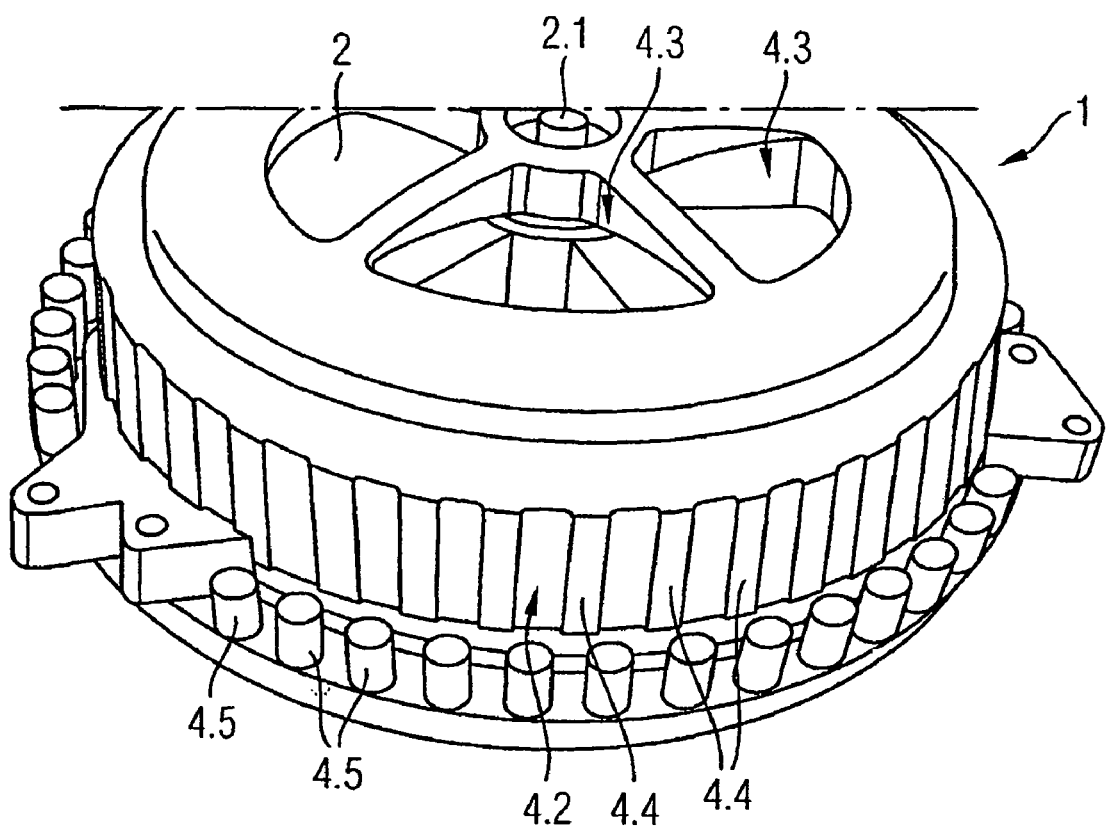
FIG. 3 shows a perspective view of the exterior of a motor housing with cooling fins and cooling pegs.

FIG. 3 depicts a perspective exterior view of an embodiment of the electromotor 1 without ventilator vessel. The ventilator vessel is not shown so as to allow important details of the motor housing to be visible. Clearly to be seen arranged on the exterior of the housing vessel 4.2 are the moldings in the form of cooling fins 4.4 and cooling pegs 4.5, which moldings increase the outer surface of the motor housing that the cooling air flow flows over. In the visible face of the motor housing 4, there are ventilation openings 4.3 arranged, through which openings the internal rotor 2 accommodated in the housing is visible. The rotor shaft 2.1 projects through the face of the motor housing 4 to the outside. In the area of the rotor shaft 2.1 visible in FIG. 3, the ventilator vessel 5 is fixably or in torque proof fashion mounted when the electromotor 1 is in ready assembled state.

Figure 4:
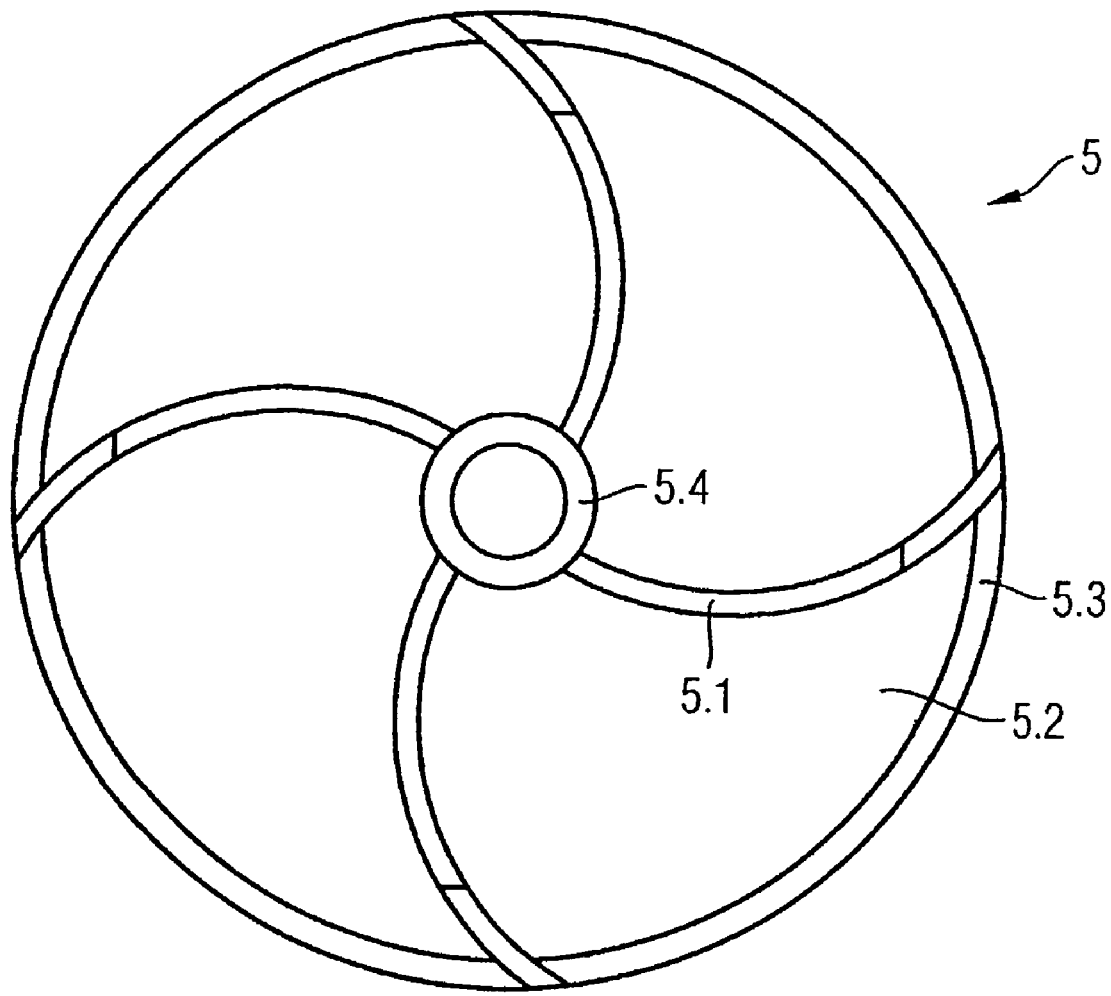
FIG. 4 shows a view from above of the inside of a ventilator vessel and FIG. 5 shows a perspective view of a ventilator vessel, which is at the same time the hub of an impeller. Objects that have the same function and name are identified in the figures with the same reference sign throughout.

The view from above of the internal surface of a ventilator vessel depicted in FIG. 4, shows the air blades 5.1 arranged on the ventilator vessel floor 5.2 extending from the ventilator vessel hub 5.4 to over the ventilator vessel edge 5.3. In this special embodiment the air blades 5.1 run in radial direction spirally curved from the ventilator vessel hub 5.4 up to the ventilator vessel edge 5.3. The air blades 5.1 serve at the same time as stiffening ribs for the ventilator vessel.

Figure 5:
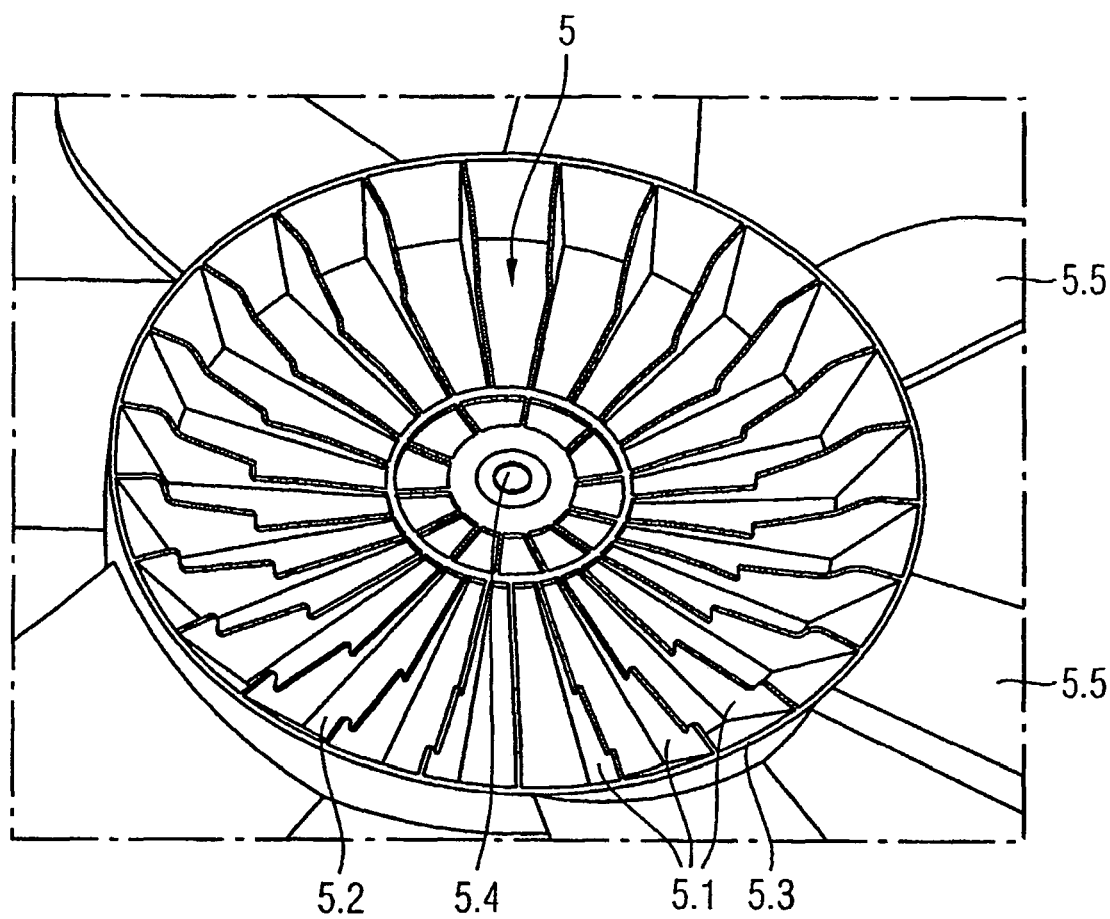

FIG. 5 depicts a perspective view of another embodiment of the ventilator vessel 5. In addition to the air blades 5.1 which are arranged on the internal surface of the ventilator vessel 5, and which run radially straight, there are blower blades 5.5 arranged on the exterior of the ventilator vessel edge 5.3. These blower blades 5.5 turn with the ventilator vessel 5 and generate a blower air flow to, for example, cool a unit arranged in the blower air flow. In this way, the electromotor 1 serves as a drive for a blower and the ventilator vessel 5 fulfils two functions simultaneously.

What is claimed is:

1. An electromotor comprising:
a rotor rotatably mounted on a rotor axle and a fixed stator in the inside of a motor housing and
a ventilator vessel, wherein the ventilator vessel is fixably connected with the rotor and at least partially encompasses the motor housing in the shape of a pot, in such a way that an air gap with an air gap opening is formed between the outer wall of the motor housing and the wall of the ventilator vessel, wherein the motor housing has ventilation openings both outside and inside the air gap and the ventilator vessel has moldings, which act as air blades and are arranged in such a way that when the rotor is turning, a difference in pressure is formed between the ventilation opening arranged outside the air gap and the air gap opening, which generates an air flow, wherein
the stator is an electromagnetically excited external stator, which has electromagnetically active iron material and a winding and which is fixably connected to and in heat conducting connection with the outside wall of the motor housing;
wherein in the inside of the motor housing the air flow flows directly past the stator and in the air gap past the exterior of the outside wall of the motor housing and takes up lost heat from the external stator in each case; and
wherein the outside wall of the motor housing has moldings inside the air gap, which moldings act as cooling elements.

2. The electromotor according to claim 1, wherein the outside wall of the motor housing has moldings in areas adjacent to the air gap opening, which moldings act as cooling elements.

3. The electromotor according to claim 1, wherein, the external stator has single stator teeth, which are wound in a single tooth winding pattern, which results in the formation of open slot slits between the stator teeth, through which slits the cooling air flow flows.

4. The electromotor according to claim 1, wherein, the rotor is a permanent magnet excited internal rotor.

5. The electromotor according to claim 3, wherein, at least one of the ventilation openings is arranged on a face of the motor housing at essentially the same radial distance from the rotor axle as the slot slits between the stator teeth.

6. The electromotor according to claim 1, wherein, at least one motor housing part that is in heat conducting connection with the external stator, is made as a light metal die cast part.

7. The electromotor according to claim 1, wherein, the moldings of the ventilator vessel, which moldings act as air blades, are arranged in radial and/or axial direction straight or curved on the internal surface of the ventilator vessel and follow the contour of the motor housing leaving a minimal gap.

8. The electromotor according to claim 1, wherein, the electromotor is used as the drive of a cooling blower and the ventilator vessel serves as the hub of an impeller, wherein blower blades are mounted on the exterior of the ventilator vessel in order to generate the blower air flow.

9. An electromotor comprising a rotor rotatably mounted on a rotor axle and a fixed stator in the inside of a motor housing, and a ventilator vessel connected in torque proof fashion with the rotor and at least partially encompassing the motor housing in the shape of a pot, such that an air gap with an air gap opening is formed between the outer wall of the motor housing and the wall of the ventilator vessel, wherein the motor housing has ventilation openings both outside and inside the air gap and the ventilator vessel has moldings, which act as air blades and are arranged such that when the rotor is turning, a difference in pressure is formed between the ventilation opening arranged outside the air gap and the air gap opening, which generates an air flow, wherein the stator is an electromagnetically excited external stator, which has electromagnetically active iron material and a winding and which is connected in torque proof fashion to and in heat conducting connection with the outside wall of the motor housing and wherein in the inside of the motor housing the air flow flows directly past the stator and in the air gap past the exterior of the outside wall of the motor housing and takes up lost heat from the external stator in each case, wherein the external stator has single stator teeth, which are wound in a single tooth winding pattern, which results in the formation of open slot slits between the stator teeth, through which slits the cooling air flow flows, wherein at least one of the ventilation openings is arranged on a face of the motor housing at essentially the same radial distance from the rotor axle as the slot slits between the stator teeth in order to enable the air flow entering the inside of the motor housing to hit the slot slits directly;

wherein the moldings of the ventilator vessel, which moldings act as air blades, are arranged in radial and axial direction straight or curved on the internal surface of the ventilator vessel and follow the contour of the motor housing leaving a minimal gap and wherein the outside wall of the motor housing has moldings inside the air gap, which moldings act as cooling elements.

10. The electromotor according to claim 9, wherein the outside wall of the motor housing has moldings in areas adjacent to the air gap opening, which moldings act as cooling elements.

11. The electromotor according to claim 9, wherein, the rotor is a permanent magnet excited internal rotor.

12. The electromotor according to claim 9, wherein, at least one of the ventilation openings is arranged on a face of the motor housing at essentially the same radial distance from the rotor axle as the winding of the stator.

13. The electromotor according to claim 9, wherein, at least one motor housing part that is in heat conducting connection with the external stator, is made as a light metal die cast part.

14. The electromotor according to claim 9, wherein, the electromotor is used as the drive of a cooling blower and the ventilator vessel serves as the hub of an impeller, wherein blower blades are mounted on the exterior of the ventilator vessel in order to generate the blower air flow.

15. The electromotor according to claim 1 wherein at least one of the ventilation openings is arranged on a face of the motor housing at essentially the same radial distance from the rotor axle as the winding of the stator in order to enable the air flow entering the inside of the motor housing to hit the winding directly.

* * * * *